United States Patent Office 3,152,149
Patented Oct. 6, 1964

3,152,149
PREPARATION OF TETRAHYDROFURAN BY THE PYROLYSIS OF BUTANE-BORATES
Donald M. Simons, Birmingham Township, Chester County, Pa., assignor to E. I. du Pont de Nemours and Company, Wilmington, Del., a corporation of Delaware
No Drawing. Filed May 10, 1961, Ser. No. 109,005
2 Claims. (Cl. 260—346.1)

This invention relates to the preparation of tetrahydrofuran, and more particularly to the preparation of tetrahydrofuran by the pyrolysis of organic borate esters.

It is an object of this invention to provide a novel process for the production of tetrahydrofuran. A further object is to provide a novel process for the production of tetrahydrofuran by the pyrolysis of organic borate esters. Other objects will appear hereinafter.

These and other objects of this invention are accomplished by the pyrolysis of a borate ester to produce tetrahydrofuran, the essential identifying structural characteristic of said borate ester being that it contain a moiety having a —O—CH$_2$—CH$_2$—CH$_2$—CH$_2$—O— radical wherein the residual oxygen valences are attached to the same or a different boron atom.

The tetrahydrofuran prepared by this process is obtained by introducing a borate ester of the above-described type under an inert non-oxidizing atmosphere into a zone maintained at a temperature of at least 200° C., and removing the tetrahydrofuran, thereby formed, from said zone.

The pyrolyzate produced in the reaction zone is collected beyond it by conventional cooling means. Separation of the tetrahydrofuran from hydroxyl-containing by-products, which are usually present, is readily accomplished by reacting them with at least an equivalent amount of a high boiling organic isocyanate (or polyisocyanate) in order to convert them to relatively non-volatile urethanes from which the lower boiling tetrahydrofuran may readily be removed by conventional fractional distillation. The empyreumatic odor usually present may be removed, if desired, by use of activated charcoal. The pyrolyzate should be stabilized against peroxidation by exclusion of air and incorporation of antioxidants such as hydroquinone.

The reaction temperature is a very important feature of the present invention. The rate of tetrahydrofuran evolution falls off as the temperature is lowered. The temperature should be at least 200° C.; however, higher temperatures can be more conveniently employed in order to shorten the reaction time. The preferred temperatures range between 500 and 600° C. Temperatures much above 600° C. are unnecessary; also side reactions become more serious. In general, on account of the high operating temperatures it is necessary to remove the tetrahydrofuran vapor from the reaction zone.

Any conventional heat source can be used in the present invention.

It is essential that the pyrolysis zone be free from air or other oxidizing agents in order to avoid fire and explosion hazards. A continual sweep with an inert gas such as nitrogen or argon is helpful.

The process is generally operated at atmospheric pressure. However, sub-atmospheric pressure is suitable.

The reaction vessel should be made of a material which is dimensionally stable and chemically inert under the operating conditions. Representative examples of suitable materials are: iron, steel, stainless steel, nickel, "Vycor" glass and quartz.

The essential identifying structural characteristic of the borate ester is that it contain a moiety having a

—O—CH$_2$—CH$_2$—CH$_2$—CH$_2$—O—

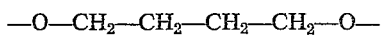

radical wherein the residual oxygen valences are attached to the same boron atom (to form a cyclic structure) or to a different boron atom.

There are many ways to make the borate ester. The following procedures are illustrative. The ester can be made by reacting 3 moles of 1,4-butanediol with about 2 moles of boric acid; the water evolved is a guide to the extent of the condensation. Enough heat is supplied to the reaction flask to volatilize the water at the operating pressure. Temperatures below about 200° C. are suitable. By subsequently transferring this ester to the pyrolysis zone and heating it there at temperatures above 200° C. tetrahydrofuran is obtained. The temperature of the esterification reaction itself can be allowed to reach 200° C., if desired. Esterification will be essentially complete before pyrolysis has occurred to a significant extent at that temperature. Since this ester tends to be viscous or gel-like, it is generally more convenient to make it in situ in the pyrolysis zone; frequently, it is convenient to add the reactants at room temperature.

Trialkyl borates (RO)$_3$B where R is 1 to 8 carbon atoms can be substituted for boric acid in making the borate ester for the pyrolysis. The alcohol ROH displaced can be easily taken off under vacuum and its volume used as a guide to the completeness of the reaction. When trioctyl borate is used the resulting alcohol would be 1-octanol. The best results are obtained when R is 1 to 4 carbon atoms. Lower trialkyl borates such as triethyl borate or triisobutyl borate are preferred since they give low-boiling alcohols.

Enough heat is supplied to the reaction flask to volatilize the alcohol liberated at the operating pressure. Temperatures below about 400° C. are suitable. Since the borate ester product is frequently very viscous or gel-like, it is best to prepare it in the same vessel which will serve for the pyrolysis zone.

Boron oxide (B$_2$O$_3$) can also be used in place of boric acid to prepare the borate ester for the pyrolysis. Three moles of 1,4-butanediol react with one mole of B$_2$O$_3$ in toluene; the liberated water is distilled off.

Still another way of obtaining a borate ester employs 1,4-bis(1-boracyclopentyl)butane

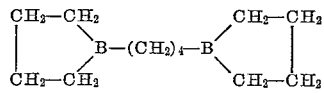

In order to obtain the ester each atom of boron is oxidized with 3 atoms of oxygen (or its equivalent provided by an oxygen-bearing agent). Air or oxygen is introduced into an anhydrous solution of the organoborine in a volatile solvent which is not readily oxidized, such as tertiary butyl alcohol or n-hexane. The air oxidation is very exothermic; hence the oxidation begins at room temperature and the rate of air or oxygen input is carefully controlled. If desired, organic or inorganic acids can be used to oxidize the organoborine. The resulting borate ester reaction product when pyrolyzed according to the process of the present invention will yield tetrahydrofuran.

The 1,4-bis(1-boracyclopentyl)butane is prepared as follows:

Two reaction vessels are used. Diborane is generated in the first and contacted with the 1,3-butadiene in the second. Argon gas is swept through both vessels to displace air as completely as possible before the reaction is begun. A continual argon sweep is maintained during the reaction to maintain a positive pressure in the system. The exit vent of the second reactor is connected to a bubbler tower containing acetone; any diborane displaced from the second reactor is destroyed as it emerges from the bubbler tube below the surface of the acetone. After the reaction has been completed, argon is swept through the reaction vessels for several hours to remove residual diborane.

Into the first vessel are poured 50 milliliters of the dimethyl ether of diethylene glycol and 25 milliliters of boron trifluoride:diethylether complex. Into the second vessel are introduced with agitation 100 milliliters of anhydrous ether and 150 milliliters of anhydrous pentane. External cooling is applied and the temperature of the well-stirred solution is lowered to about 2° C.

Diborane is generated by adding 240 milliliters of a 0.75 M sodium borohydride solution in the dimethyl ether of diethylene glycol to the first vessel with agitation over a one hour period. The diborane is swept into the second vessel where it is admitted by a bubbler outlet positioned below the surface of the solution contained therein. When the diborane begins to enter, 25 milliliters of 1,3-butadiene are added with stirring to the chilled solution in the second flask in about 6 minutes. About 15 milliliters of the sodium borohydride solution have been used at this point; the remaining 225 milliliters are subsequently introduced in about 54 minutes while agitation is continually maintained and the temperature in the second vessel is kept between about 2 to 10.5° C. After standing at room temperature for about 16 hours, the solution containing the organoborine is removed from the second vessel and concentrated under vacuum to yield 15.7 grams of 1,4-bis(1-boracyclopentyl)butane—a clear, colorless, oily liquid which boils at 113–115° C. (9 mm. Hg) and bursts into a green flame on uncontrolled exposure to air.

The following examples will better illustrate the nature of the present invention; however, the invention is not intended to be limited to these examples.

*Example 1*

The reactor was a 500-ml. 2-neck round-bottom "Vycor" (96% $SiO_3$, 4% $B_2O_3$, traces of $Na_2O$ etc.) flask. A slow stream of nitrogen continually entered through one neck.

After 1,4-butanediol (270 grams, 3 moles) and boric acid (124 grams, 2 moles) had been introduced, the reactor was fitted with a water-cooled condenser leading to a receiver cooled by crushed solid carbon dioxide. When the reactor was heated with a Fisher burner (at medium flame), the boric acid dissolved in the glycol to give a clear mobile liquid which gradually became viscous as water distilled off and esterification proceeded. After 93.5 milliliters of water had been collected, the reactor was heated red hot with the full flame of the burner (temperature of about 540° C.); distillation was continued until only a gray friable residue ($B_2O_3$) remained in the reactor. The distillate collected (160.2 grams) during this period was distilled through a spinning band column to give 92.8 grams boiling at 63.5–70° C. (760 mm. Hg). This liquid was refluxed with 18 grams of KOH pellets and a spoonful of activated charcoal for 1 hour, cooled, filtered, and distilled to give 84.1 grams boiling at 65° C. (760 mm. Hg). The infrared spectrum of this material was very similar to that of tetrahydrofuran except that it showed the presence of some hydroxyl groups and C=C unsaturation. Therefore, 40 milliliters was treated at room temperature with 6 milliliters of toluene-2,4-diisocyanate to remove the hydroxyl-bearing impurity. The reaction was exothermic and a solid separated. The reaction mixture was distilled at reduced pressure, collecting everything volatile in a Dry Ice trap. Fractional distillation of the condensate gave tetrahydrofuran boiling at 65° C. (760 mm. Hg), identified by vapor phase chromatographic techniques.

*Example 2*

The 500-ml. "Vycor" reaction flask used in the procedure of Example 1 was fitted with a 1-piece Claisen head-condenser equipped with a thermocouple. After 62 grams (1.0 mole) of boric acid and 135 (1.5 moles) of 1,4-butanediol had been introduced at room temperature, the flask was heated (under a continual nitrogen sweep) in a Wood's metal bath.

The temperature of the metal bath was allowed to rise to 325° C. during the course of 2 hours and 40 minutes. The temperature of the reaction mixture (internal temperature) had then risen to about 155° C. and the distillation of chemically formed water had practically ceased. The heating was continued for about 24 hours the bath temperature being maintained in the range 300–380° C. The reaction mixture gradually pyrolyzed and the pyrolyzate distilled into the receiver. Pyrolysis proceeded extremely slowly when the internal temperature was below 200° C.

When the distillation of product had ceased, the pyrolyzate which had collected in the receiver was redistilled at atmospheric pressure through a 12-inch column to effect a crude separation from water. The fraction boiling from 60 to 70° C. was collected. This fraction was then treated with toluene-2,4-diisocyanate to react with any remaining water and other hydroxyl-containing impurities as described in Example 1. Final distillation through a spinning band column gave tetrahydrofuran, B.P. 66° C., identified by its infrared spectrum and by vapor phase chromatography. The latter method indicated that the product was 99.9% pure tetrahydrofuran.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for the production of tetrahydrofuran comprising the steps of pyrolyzing a 1,4-butanediol borate ester, which consists essentially of a $$-O-(CH_2)_4-O-$$

radical wherein the residual oxygen valences of said radical are attached to a boron atom, at a temperature of at least 200° C. in an inert non-oxidizing atmosphere and isolating the resulting tetrahydrofuran, said borate ester being selected from the group consisting of (1) the oxidation product of 1,4-bis(1-boracyclopentyl)butane and (2) esters of 1,4-butanediol with a member selected from the group consisting of (a) boric acid, (b) $B_2O_3$, and (c) trialkyl borates of the formula $(RO)_3B$ where R is 1 to 8 carbon atoms.

2. A process as defined in claim 1 wherein said temperature is from about 500° to 600° C.

References Cited in the file of this patent

UNITED STATES PATENTS

| | | |
|---|---|---|
| 2,402,590 | Arnold | June 25, 1946 |
| 3,013,046 | Denny et al. | Dec. 12, 1961 |
| 3,036,111 | Willcockson | May 22, 1962 |
| 3,078,296 | Bengelsdorf | Feb. 19, 1963 |

OTHER REFERENCES

Bergmann: Chem. of Acetylenic and Related Cpds., Intersciences, 1948, page 80.